(12) United States Patent
Goldammer et al.

(10) Patent No.: US 6,820,886 B2
(45) Date of Patent: Nov. 23, 2004

(54) MODULAR BUTT-JOINTED YOKE FOR MOTORCYCLES

(76) Inventors: Roger David Scott Goldammer, 168 Rimrock Court, Kelowna, British Columbia (CA), V1W 4J6; Scott Ronald Johnson, 168 Rimrock Court, Kelowna, British Columbia (CA), V1W 4J6

( * ) Notice: Subject to any disclaimer, the term of this patent is extended or adjusted under 35 U.S.C. 154(b) by 0 days.

(21) Appl. No.: 10/355,096

(22) Filed: Jan. 31, 2003

(65) Prior Publication Data

US 2003/0111822 A1 Jun. 19, 2003

Related U.S. Application Data

(63) Continuation-in-part of application No. 10/101,941, filed on Mar. 21, 2002, now abandoned.
(60) Provisional application No. 60/284,518, filed on Apr. 19, 2001.

(51) Int. Cl.$^7$ .............................................. B62K 19/32
(52) U.S. Cl. ....................... 280/279; 180/219; D12/118
(58) Field of Search ................................ 280/274–276, 280/279, 280, 283; 180/218–219; D12/118

(56) References Cited

U.S. PATENT DOCUMENTS

| 5,269,549 A | 12/1993 | Wilson et al. |
| D368,054 S | 3/1996 | Behrens et al. |
| D406,802 S | 3/1999 | D'Aluisio et al. |
| D411,147 S | 6/1999 | Tsai |
| D414,141 S | 9/1999 | Tsai |
| D421,939 S | 3/2000 | Lin |

FOREIGN PATENT DOCUMENTS

| CA | 1176180 | 10/1984 |
| DE | 199 29 007 | 12/2000 |
| WO | WO 88/09739 | 12/1988 |

*Primary Examiner*—Lesley D. Morris
*Assistant Examiner*—Matthew Luby
(74) *Attorney, Agent, or Firm*—Antony C. Edwards (57) ABSTRACT

A front fork yoke for a motorcycle where the yoke includes a parallel pair of posts rigidly maintained laterally spaced apart by a pair of parallel semi-circular arches extending laterally between the posts. The imposts of the upper arch are curved rounded-over shoulders. The front face of the yoke is smoothly rounded-over towards the rear face of the yoke. The arches are upwardly convex and support the motorcycle head tube therebetween. The lower arch is butt-jointed to the fork uprights without the use of collars external to the uprights.

24 Claims, 11 Drawing Sheets

MODULAR BUTT-JOINTED YOKE FOR MOTORCYCLES

CROSS REFERENCE TO RELATED APPLICATION

This application is a Continuation-in-Part of U.S. patent application Ser. No. 10/101,941 filed Mar. 21, 2002 now abandoned which claims priority from U.S. Provisional Patent Application No. 60/284,518 filed Apr. 19, 2001 entitled One-Piece Conventional-Fork Curved Yoke for Motorcycles.

FIELD OF THE INVENTION

This invention relates to the field of devices for securing motorcycle front forks to the head tube of the motorcycle frame, and in particular, to an improved yoke for the mounting of front forks to the head tube.

BACKGROUND OF THE INVENTION

Figure 1:
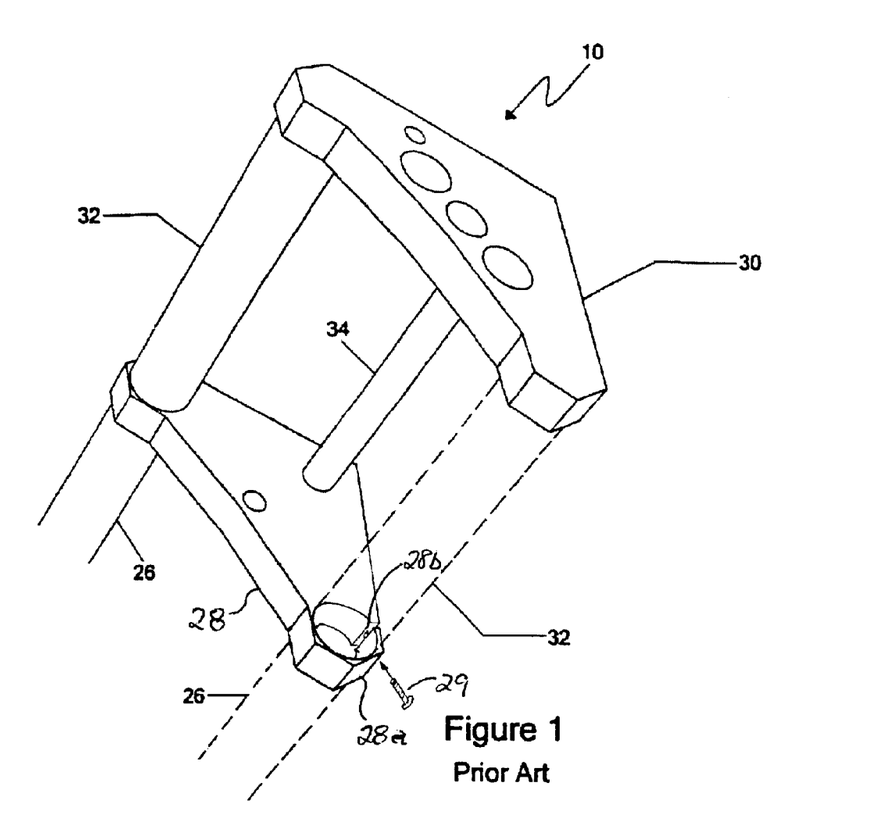
FIG. 1 is, in perspective view, a prior art motorcycle yoke.
Figure 2:
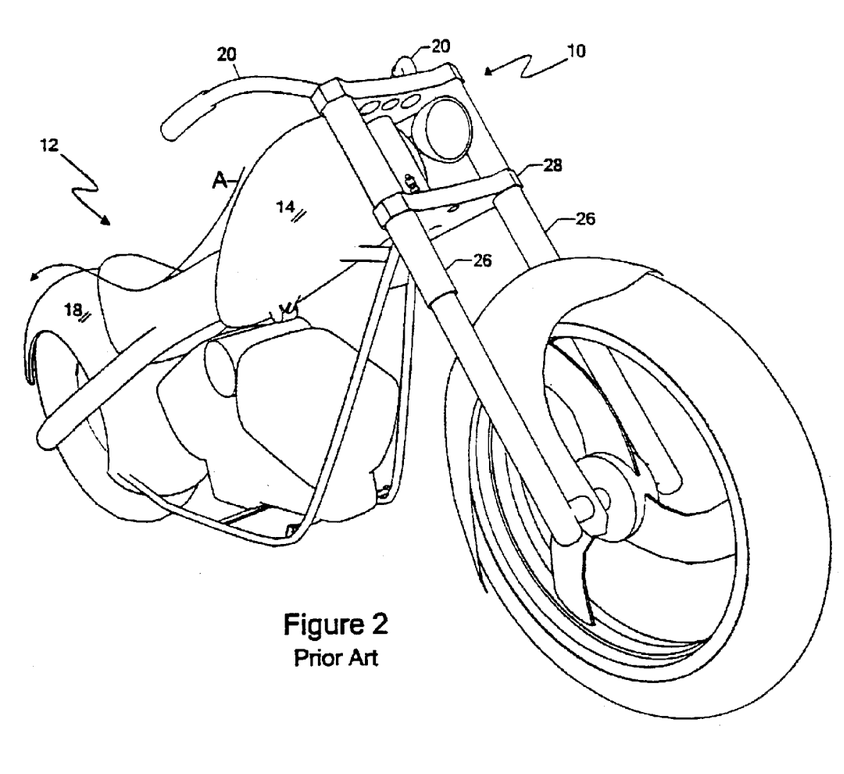
FIG. 2 is, in perspective view, a customized motorcycle incorporating the prior art yoke of FIG. 1.
Figure 3:
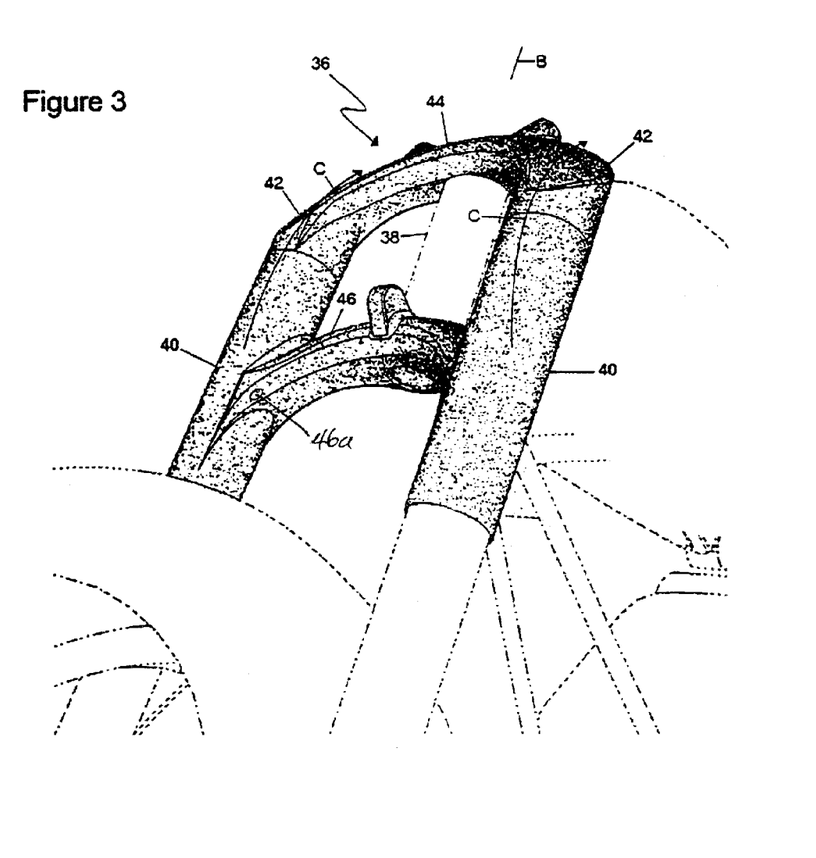
FIG. 3 is, in perspective view, the yoke of the present invention mounted to a motorcycle frame.
Figure 4:
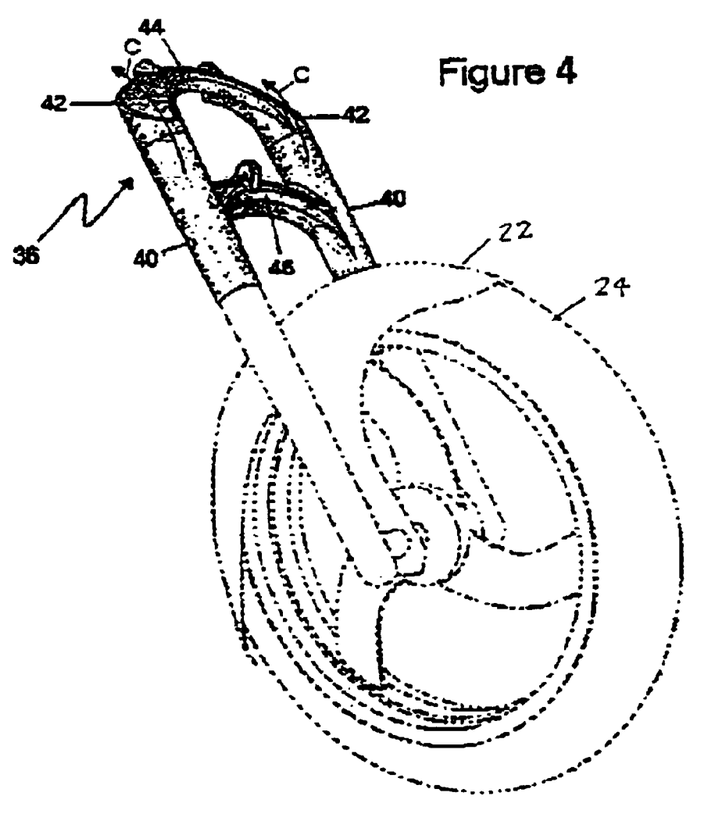
FIG. 4 is, in perspective view, the yoke of FIG. 3 mounted to front forks.
Figure 5:
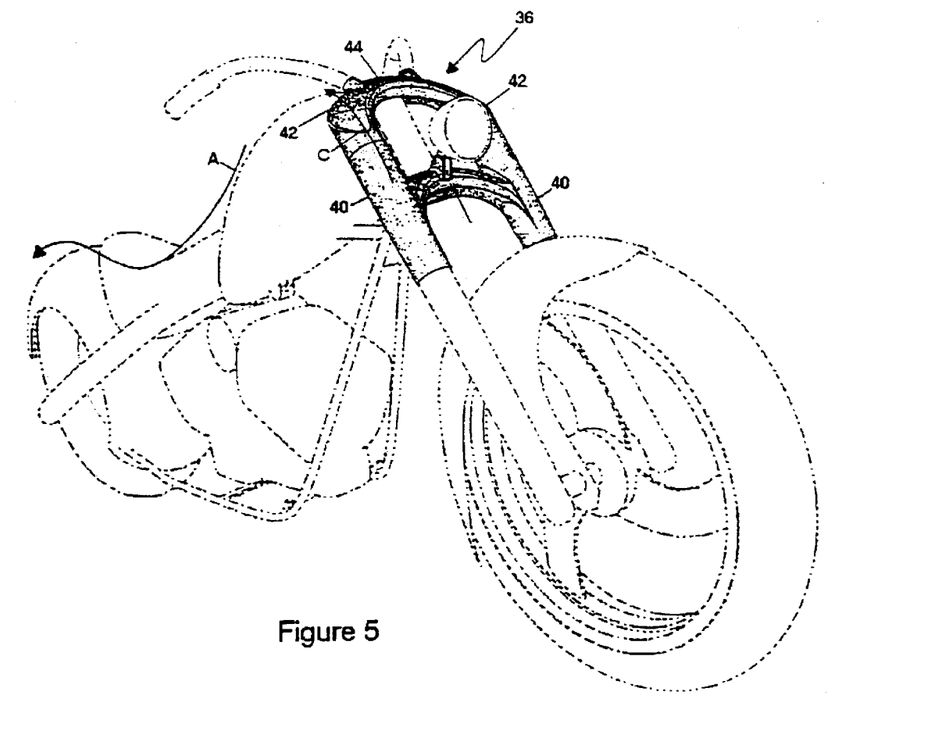
FIG. 5 is, in perspective view, the customized motorcycle of FIG. 2 employing the improved yoke of the present invention.
Figure 6:
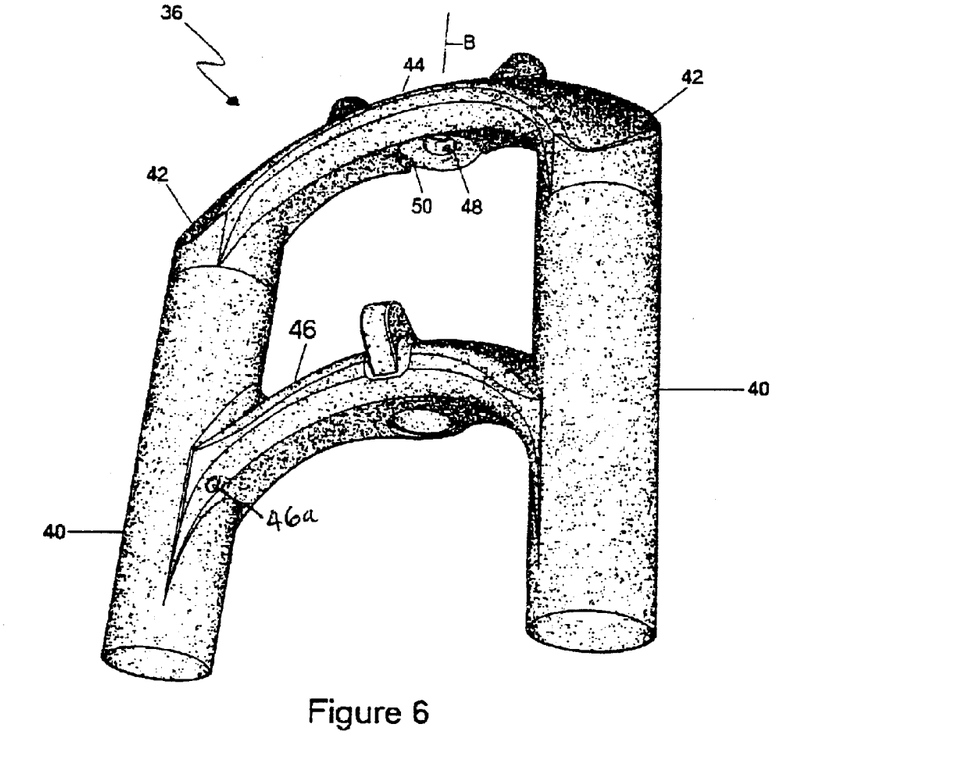
FIG. 6 is, in enlarged view, the yoke of FIG. 3.

As seen in FIGS. 1 and 2, it is known in the prior art to use angularly shaped sharp or hard-edged yokes for pivotally mounting motorcycle front forks to the head tube of the motorcycle frame. For use on motorcycles such as Harley Davidson™ motorcycles, such components may be purchased from vendors such as Perse Performance™ of Englewood, Colo., for example components from that vendor referred to as Triple Trees™. Conventionally yokes such as the Triple Tree kits marketed by Perse Performance™ are manufactured as a kit of separate components that must be assembled to form the yoke. The yokes clamp around the outside of the fork tubes. The clamping of the yokes around the outside of the fork tubes may reduce the aesthetic appeal of the motorcycle. Further, it introduces the potential for a loss of rigidity of the yoke, such a loss of rigidity being undesirable in that the front wheel of the motorcycle is cantilevered from the yoke at the end of relatively long forks and thus subject to considerable force, bending moment and vibration.

There is a significant aftermarket in customizing motorcycles such as Harley Davidson™ motorcycles. One such example is the subject of FIG. 2, being a customized motorcycle used for display at motorcycle shows and the like. As may be seen, the customizing of the motorcycle results in a significantly rounded, flowing design where the conventional teardrop shape of the fuel tank is modified so that the fuel tank flows conformably into the seat pad saddle which itself then slows curvaceously into the swell of the rust fender. This lends the motorcycle a low elegantly curved profile. The curved low side-on profile is complemented by the use of aft-swept arcuately curved handlebars sweeping back from where they are mounted to the yoke immediately adjacent the head tube of the frame to which the motor and lower decorative fairings or cowlings are mounted. The yoke conventionally supports the forward extending forks, the front wheel and front fender mounted cantilevered on the distal end of the forks. Conventionally, the headlight is mounted to, so as to extend forwardly from between the uprights of the yoke.

The use of a prior art yoke on such a customized motorcycle, or for that matter other customized motorcycles which have rearwardly flowing curved lines in side-on profile, rather harshly interrupts the flowing lines of the profile due to the conventional hard-edged clamping of the corners of the generally triangular mounting plates around the exterior surface of the upper ends of the fork tubes or posts.

Thus in the present invention it is an object to provide a yoke which has, contrary to the motorcycle prior art of which applicant is aware, modular butt-jointed cross-bearing members or arches, where the yoke smoothly and aerodynamically curves rearwardly so as to complement the rearward flowing lines of the adjacent teardrop-shaped fuel tank on the motorcycle when the yoke is mounted to the head tube.

SUMMARY OF THE INVENTION

In summary the present invention is a modular butt-jointed front fork yoke for a motorcycle. The yoke may include upper and lower arches extending between a parallel pair of posts wherein the lower arch is butt-jointed to the pair of posts. Each post has an upper end and an opposite lower end. The upper arch extends from and between each upper end of the posts. Each upper end forms an impost at opposite ends of the upper arch.

The lower arch parallels the upper arch and is mounted to, so as to extend between, the lower ends of the pair of posts or adjacent the lower ends of the posts. The upper and lower arches each have a vertice lying on or adjacent an axis of rotation of the yoke when the yoke is mounted to a motorcycle frame so that a head tube of the frame is coaxial with the axis of rotation and is mountable snugly between the vertices of the upper and lower arches. The upper and lower arches each form a corresponding concavity under each arch which opens downwardly towards the lower ends of the posts.

The imposts form a pair of rounded-over shoulders between the upper arch and the posts. The shoulders are rounded in a plane containing the pair of posts so as to smoothly blend outer surfaces of the upper ends of the posts into outer surfaces of opposite ends of the upper arch, and are rounded-over between the front and rear of the yoke.

The pair of posts and the arches collectively have a front face, for facing forwardly from the motorcycle when the yoke is mounted to the motorcycle frame, and an opposite rear face. The arches have corresponding rear surfaces. Protrusions on the rear surfaces of the arches are curved so as to smoothly protrude rearwardly adjacent the vertices of the arches. The protrusions are adapted for vertically aligned mounting of the head tube therebetween. The front face is smoothly rounded over toward the rear face around forwardly exposed edges of the posts and the arches. The shoulders are rounded so as to smoothly blend from the front face at the upper ends of the posts, upwardly into the opposite ends of the upper arch and rearwardly so as to round smoothly into the rear face. The yoke is adapted so that the front face rakes, and is curved upwardly, aft when the yoke is mounted on the motorcycle frame, whereby a side profile of the yoke smoothly and aerodynamically blends into aft flowing curved lines of the motorcycle.

In one embodiment the pair of posts may be a pair of cylinders and the arches may each be generally semi-circular, that is, semi-circular or a lesser segment of a circle. The shoulders may be cupped so that each is shaped in the form of a cup-segment, that is, smoothly rounded as might be a well muscled human shoulder. Thus the arches and the shoulders may each have an upper surface which is rounded from the front face to the rear face of the yoke symmetrically about the above-defined plane, in which case the plane bisects the pair of posts so that longitudinal axes of symmetry of each post lie in the plane.

The lower arch parallels the upper arch and is butt-joint mounted to the posts or uprights at each end of the lower arch, so as to extend between the lower ends of the posts or adjacent the lower ends of the posts.

In one embodiment not intended to be limiting, each post has a symmetrical aperture in a sidewall thereof, and inside each post is a ledge adjacent the lower end of the post such that the ledge is below the aperture. Each post has an outer diameter, measured between the outer edges of one end of the post, and an inner diameter, measured between the inner edges of that end of the post.

Two hollow collars or cylinders are provided, each having an upper end and a lower end. Each cylinder is open at both ends. Each cylinder has an asymmetrical aperture, that is, a cammed aperture having an asymmetric cam surface. Each cylinder has an outer diameter, measured between the outer edges of one end of the cylinder, and an inner diameter, measured between the inner edges of that end of the cylinder. The outer diameter of each cylinder approximates, that is, is slightly less than the inner diameter of each post for snug flush sliding fitment of a cylinder into a corresponding post.

Thus, when a cylinder is inserted into each post, each cylinder rests on the ledge inside the corresponding post so as to align the cammed aperture on the cylinder with the symmetrical aperture in the post. A corresponding cammed nut is mounted into the cammed aperture so as to mate the asymmetrically cammed surfaces, thereby preventing rotation of the nut in the cammed aperture. Bolts are inserted through bolt-holes in the ends of the lower arch, through the symmetric apertures in the posts so as to threadably engage the cammed nuts mounted in the cammed apertures in the cylinders. Tightening the bolts draws the ends of the lower arch rigidly onto the opposed facing outer surfaces of the pair of posts.

DETAILED DESCRIPTION OF EMBODIMENTS OF THE INVENTION

A prior art yoke 10 is illustrated in FIGS. 1 and 2, in FIG. 2 shown mounted on a customized motorcycle 12 such as a customized Harley Davidson™ motorcycle. In the illustrated example of FIG. 2, which is only intended to be by way of example and not intended to be limiting, the fuel tank 14 flows curvaceously aft, as indicated in FIG. 2 by direction arrow A, so as to conformably blend into saddle 16 and then swell arcuately over curved rear fender 18. The flowing profile of fuel tank 14, saddle 16 and fender 18 is complemented by the rearwardly arcuately swept shape of handlebars 20 and by the shape of front fender 22 which is conformably curved to front wheel 24.

Front wheel 24 and fender 22 are mounted to the forward or distal ends of conventional forks 26, forks 26 being rigidly mounted to, so as to extend cantilevered from, the base plate 28 of prior art yoke 10.

As better seen in FIG. 1, prior art yoke 10 consists of base plate 28 mounted in parallel spaced apart relation to top plate 30 by three parallel spaced apart posts including a pair of laterally spaced posts 32 and a central post 34. Central post 34 pivotally mounts into the correspondingly-sized head tube of the motorcycle frame so as to allow steering by pivoting of front wheel 24 about the longitudinal axis of the head tube. The parts are bolted together. In particular, the front corners of base plate 28 are formed as collar clamps 28a which may be tensioned onto and around forks 26 by tightening bolts 29 into threaded bolt-holes 28b.

As seen in FIGS. 3–6, the yoke 36 of the present invention is smoothly and aerodynamically contoured so that, once mounted to head tube 38 so as to be angled or raked aft, for example in the conventional 35 degree to horizontal orientation of forks 26, the rounded pair of columnar uprights 40 smoothly blend at shoulders 42 upwardly and rearwardly into arch 44 which itself curves upwardly and rearwardly from shoulders 42 so as to medially intersect the axis of rotation B of head tube 38. The upper arch 44 and shoulders 42 of yoke 36 are formed as a single unitary piece, for example milled, cast or forged. This reduces vibration and increases rigidity which provides advantages over the prior art. The surfaces of shoulders 42 and arch 44 are rounded-over from front to back so that a tangent to the curvature of the surfaces becomes approximately parallel to the curvature of fuel tank 14 along line A. A correspondingly formed lower arch 46 extends in generally parallel array with arch 44 between the lower ends of uprights 40 so as to medially intersect axis of rotation B below head tube 38. As better described below, arch 46 is mounted to uprights 40 so as to be butt-jointed thereto, that is, without the use of external collars or clamps around the uprights.

Thus, once yoke 36 is mounted onto head tube 38, the aft-raked flowing lines of yoke 36 such as illustrated by way of example by profile lines C, complement the flowing lines exemplified by profile line A in rearwardly flowing symmetry as would be expected if the design resulted from wind tunnel testing for aerodynamic efficiency. The flowing lines exemplified by lines C as they flow upwardly and rearwardly over yoke 36 also complement the aft-raked curvature of handlebars 20 and the smoothly rearwardly flowing profile of fuel tank 14, saddle 16 and rear fender 18, and appear a natural adjunct of the curvature of front wheel 24 and fender 22.

Figure 7:
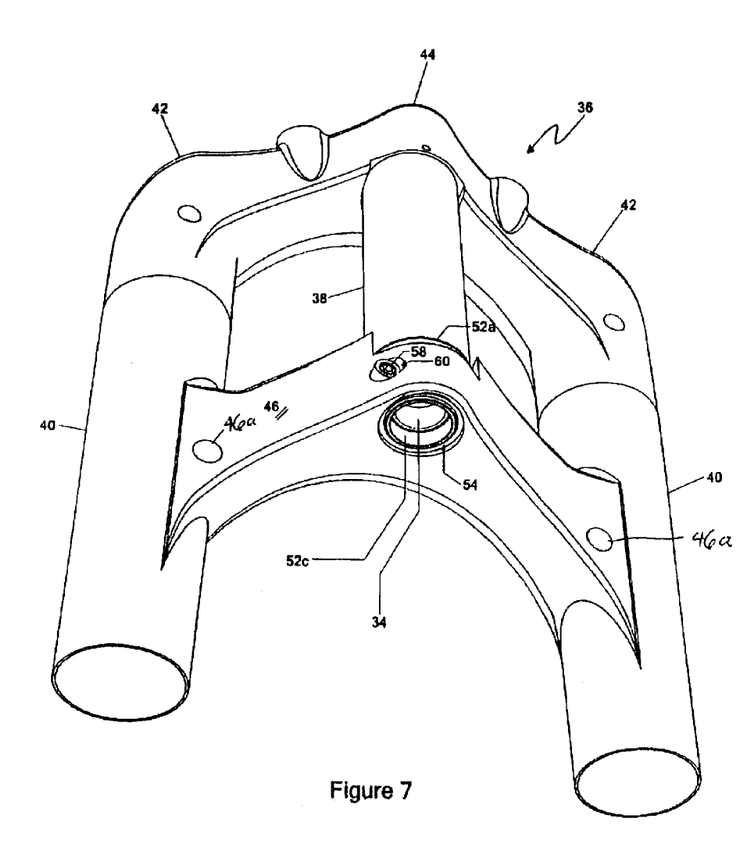
FIG. 7 is, in rear perspective view, the yoke of FIG. 5.
Figure 8:
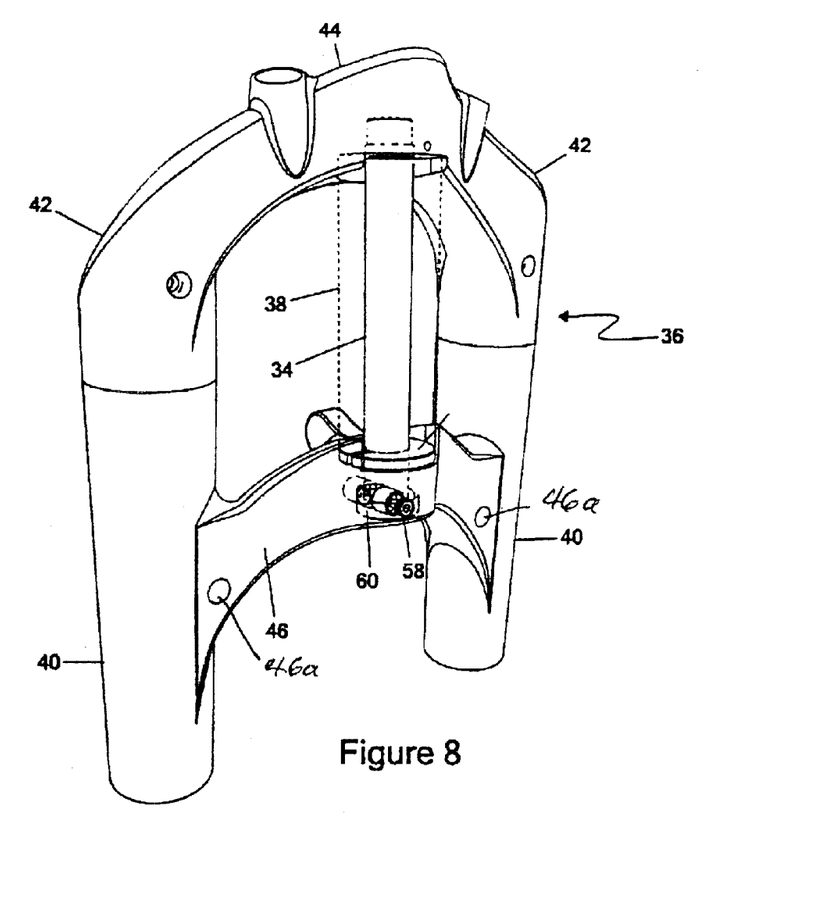
FIG. 8 is, in front perspective partially exploded view, the yoke of FIG. 7.
Figure 9:
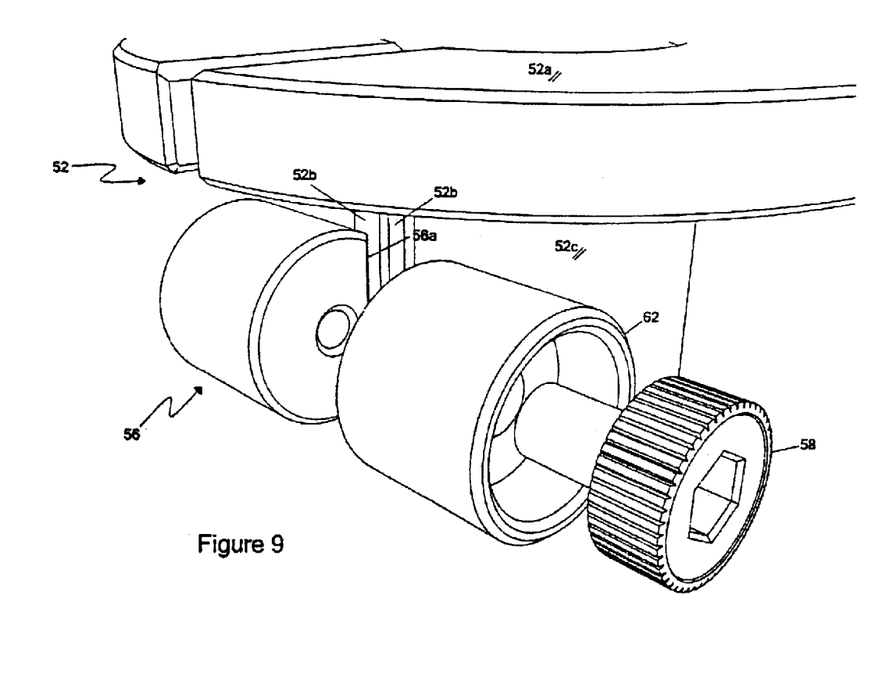
FIG. 9 is, in exploded partially cut-away view, the lower arch butt-jointing mechanism of the yoke of FIG. 8.

As better seen in FIGS. 7–9, head tube 38 is mounted between arches 44 and 46 rotatably onto a removable central post 34. The uppermost end of central post 34 mounts into a correspondingly sized bore 48 on the underside of arch 44, bore 48 being coaxial with axis of rotation B. The uppermost end of head tube 38 may rotatably mount within seat 50 on the underside of arch 44. Head tube 38 is held seated within seat 50 by means of adjustable collar 52 mounted snugged upwardly against the base of head tube 38 so as to snug upper collar flange 52a upwardly against the base of the head tube.

The lower or base end of central post 34 is journalled along axis of rotation B through collar 52. Arch 46 has a correspondingly sized bore 54 which extends through the arch for receiving collar 52 slidably mounted therein. With collar 52 slidably mounted within bore 54, and with flange 52a snugged upwardly against the base of head tube 38, a cammed nut 56 is threadably mounted to bolt 58 through a further bore 60 bored through arch 46 perpendicularly to bore 54. Cam surface 56a on cammed nut 56 is aligned flush against planar lands 52b on lower collar portion 52c of collar 52 so as to both clamp collar 52 onto the lower end of central post 34 and to inhibit rotation of central post 34 relative to yoke 36. Once the head of bolt 58 is tightened into cup washer 62 against cammed nut 56, movement of collar 52 along axis B is inhibited.

In the butt-jointed mounting of lower arch 46 onto posts or uprights 40 as seen in FIGS. 10, 10a, 10b and 10c, a collar or cylinder 120 is co-axially inserted into each upright 40 such that the lower surface 120b of each cylinder 120 rests on the ledge 40b inside each upright 40. An asymmetric or cammed hole or aperture 120a formed in the sidewall of each cylinder 120 is aligned with a symmetric hole or aperture 110a on each upright 40. The narrow end 118a of each nut 118 is inserted from the inside of a cylinder 120 through aperture 120a and into aperture 110a until base 118b of nut 118 prevents rotation of narrow end 118a of nut 118 mounted in apertures 120a and 110a.

Figures 10, 10A:
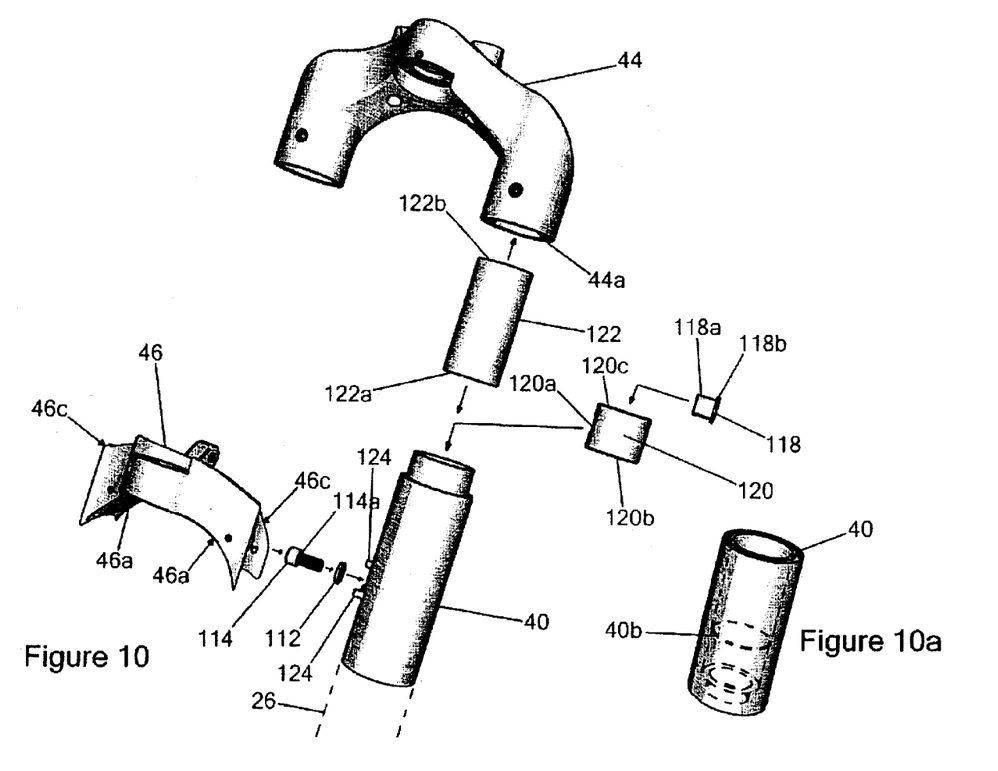
FIG. 10 is a partially cut away exploded perspective view of the modular yoke according to the present invention.
FIG. 10a is a perspective view of one post of FIG. 10.
Figure 10B:
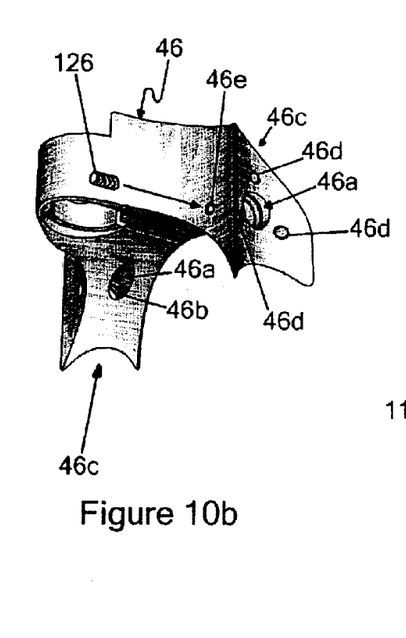
FIG. 10b is a perspective bottom view of the lower arch of FIG. 10.

Each primary mounting bolt 114 of the pair of such bolts is inserted through a corresponding bolt hole 46a in each end of lower arch 46, then through washer 112. Each bolt is then threaded into end 118a of cammed nut 118 until bolt surface 114a is flush against annular rim 46b within bolt hole 46a. A washer 112 may be sandwiched between bolt surface 114a and the surface of rim 46b.

A pair of tubes 122 are inserted into the upper ends of each upright 40 such that the lower surfaces 122a of tubes 122 are flush with the upper surfaces 120c of cylinders 120 when mounted inside uprights 40.

Shoulders 42 of upper arch 44 are mounted onto the upper surfaces 122b of tubes 122 such that each end surface 44a of arch 44 is flush with each upper surface 122b of tubes 122.

The curved ends 46c of lower arch 46 are shaped to conformably mate, adjacent apertures 110a, onto the tubular outer surfaces of uprights 40. Pins 124 protruding from uprights 40 mate into corresponding holes 46d in the curved oppositely disposed end surfaces of curved ends 46c. The primary mounting bolts 114 extend through the end surfaces of curved ends 46c so as to engage the cammed nuts 118 mounted in the cammed apertures 120a in cylinders 120. Tightening of the primary mounting bolts 114 into the cammed mats 118 mates the pins 124 into the holes 46d in the lower arch. Locking bolts 126, transversely mounted in transverse holes 46e the lower arch, once tightened, engage the heads of the primary mounting bolts 114 to prevent rotation of the primary mounting bolts once tightened into cammed nuts 118.

Figure 10C:
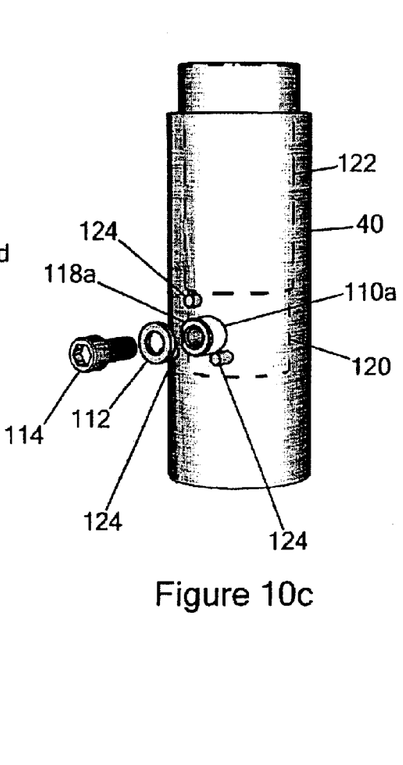
FIG. 10c is a perspective view of the post of FIG. 10a showing the cammed nut protruding from the collar mounted within the post.

Each cammed nut 118 has a flattened and asymmetrical narrow end 118a and a flattened, asymmetrical base 118b. The surface area of the base of each nut is larger than the surface area of the end of each nut. Inside each upright 40, a cammed nut 118 is journalled through the cammed aperture 120a in the cylinder 120 and then through the aperture 110a in the upright 40 until the base 118b of the nut 118 prevents further protrusion of the nut 118 into the upright 40. Each bolt 114 is inserted through a washer 112, then through a hole 46a in one end 46c of lower arch 46, then through aperture 110a in upright 40 and then threaded into end 118a of cammed nut 118. The result is that each end 46c of lower arch 46 forms a butt-joint with each upright 40.

Two 122 tubes are provided, each having an upper and a lower end for mating uprights 40 with shoulders 42. The diameter of each tube 122 provides for snug mating of the tubes into uprights 40. Each tube 122 is inserted into the upper end of an upright 40, such that the lower end of the tube abuts the upper end of a cylinder 120, and the upper end of tube 122 protrudes out of the upper end of upright 40 for mounting into shoulders 42 of upper arch 44. The upper ends of tubes 122 are inserted into shoulders 42 at the ends of upper arch 44, such that each end of the upper arch is flush with the upper end of an upright.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A front fork yoke for a motorcycle comprising:
    a parallel pair of posts, each post of said pair of posts being hollow and having an upper end and an opposite lower end, an upper arch extending from and between each said upper end of said each post, each said upper end being shoulder at opposite ends of said upper arch,
    a lower arch paralleling said upper arch and mounted to, so as to extend between, said pair of posts adjacent said lower ends of said pair of posts, said upper and lower arches each having uppermost end lying generally on an axis of rotation of said yoke when said yoke is mounted to a motorcycle frame so that a head tube of the motorcycle frame coaxial with said axis of rotation is mountable snugly between said uppermost ends of said upper and lower arches, said upper and lower arches each forming a corresponding concavity under each said arch which opens downwardly towards said lower ends of said pair of posts,
    wherein said upper arch is one unitary rigid piece and wherein said lower arch is butt-joint mounted to said pair of posts without the use of external collars around maid pair of posts.

2. The apparatus of claim 1 wherein said shoulders form a pair of shoulders between said upper arch and said pair of posts, said shoulders rounded in a plane containing said pair of posts so as to smoothly blend outer surfaces of said upper ends of said pair of posts into cuter surfaces of opposite ends of said upper arch,
    said pair of posts and said arches having a front face, for facing forwardly from the motorcycle when said yoke is mounted to the motorcycle frame, and an opposite rear face, said arches having corresponding rear surfaces, protrusions on said rear surfaces curved so as to smoothly protrude rearwardly adjacent said vertices of said arches, said protrusions adapted for vertically aligned mounting of the head tube therebetween,
    wherein said front face is smoothly rounded over toward said rear face around forwardly exposed edges of said pair of posts and said arches and wherein said shoulders are rounded so as to smoothly blend from said front face at said upper ends of said posts, upwardly into said opposite ends of said upper arch and rearwardly so as to round smoothly into said rear face, said yoke adapted so that said front face rakes, and is curved upwardly, aft when said yoke is mounted on the motorcycle frame, whereby a side profile of said yoke smoothly and aerodynamically blends into aft flowing curved lines of the motorcycle.

3. The apparatus of claim 1 wherein said pair of posts are a pair of cylinders and said arches are each generally semi-circular.

4. The apparatus of claim 2 wherein said pair of posts are a pair of cylinders and said arches are each generally semi-circular.

5. The apparatus of claim 2 wherein said shoulders are cupped so that each is shaped in the form of a cup-segment.

6. The apparatus of claim 2 wherein said arches and said shoulders each have an upper surface which is rounded from said front face to said rear face symmetrically about said plane, wherein said plane bisects said pair of posts so that longitudinal axes of symmetry of said each post lie in said plane.

7. The apparatus of claim 1 wherein said lower arch has, at oppositely disposed ends thereof, curved end surfaces shaped for snug conformal mounting onto opposed facing external mating surfaces of said pair of posts.

8. The apparatus of claim 7 wherein said oppositely disposed ends have bores therein extending from apertures in said curved end surfaces, for bolting of said lower arch to said pair of posts by bolts extending through said bores and said apertures.

9. The apparatus of claim 8 wherein said each post in said pair of posts has an aperture in each said mating surface in alignment with said apertures in said curved end surfaces when said lower arch is mounted on said pair of posts, and wherein a collar is mounted co-axially within each said post and adapted for threadably engaging said bolts so as to rigidly sandwich said mating surfaces of said pair of posts between said curved ends of said lower arch and said collars mounted co-axially within each said post.

10. The apparatus of claim 9 further comprising alignment pins mating between said curved ends and mating surfaces so as to align said pair of posts relative to said lower arch.

11. The apparatus of claim 10 wherein said pins are mounted rigidly to, so as to extend from, said mating surfaces so as to snugly mate into corresponding holes in said curved ends of said lower arch.

12. The apparatus of claim 9 wherein said collars further comprise cammed threaded nuts mounted into correspondingly asymmetric cammed apertures in said collars for threaded engagement of said bolts with said cammed threaded nuts.

13. A front fork yoke for a motorcycle comprising:
a parallel pair of posts, each post of said pair of posts being hollow and having an upper end and an opposite lower end, an upper arch extending from and between each said upper end of said each post, each said upper end being a shoulder at opposite ends of said upper arch,
a lower arch paralleling said upper arch and mounted to, so as to extend between, said pair of posts adjacent said tower ends of said pair of posts, said upper and lower arches each having an uppermost end lying generally on an axis of rotation of said yoke when said yoke is mounted to a motorcycle frame so that a head tube of the motorcycle frame coaxial with said axis of rotation is mountable snugly between said uppermost ends of said upper and lower arches, said upper and lower arches each forming a corresponding concavity under each said arch which opens downwardly towards said lower ends of said pair of posts,
wherein said upper arch is one unitary rigid piece and wherein said lower arch is butt-joint mounted to said pair of posts.

14. The apparatus of claim 13 wherein said shoulders form a pair of shoulders between said upper arch and said pair of posts, said shoulders rounded in a plane containing said pair of posts so as to smoothly blend outer surfaces of said upper ends of said pair of posts into outer surfaces of opposite ends of said upper arch,
said pair of posts and said arches having a front face, for facing forwardly from the motorcycle when said yoke is mounted to the motorcycle frame, and an opposite rear face, said arches having corresponding rear surfaces, protrusions on said rear surfaces curved so as to smoothly protrude rearwardly adjacent said vertices of said arches, said protrusions adapted for vertically aligned mounting of the head tube therebetween, wherein said front face is smoothly rounded over toward said rear face around forwardly exposed edges of said pair of posts and said arches and wherein said shoulders are rounded so as to smoothly blend from said front face at said upper ends of said posts, upwardly into said opposite ends of said upper arch and rearwardly so as to round smoothly into said rear face, said yoke adapted so that said front face rakes, and is curved upwardly, aft when said yoke is mounted on the motorcycle frame, whereby a side profile of said yoke smoothly and aerodynamically blends into aft flowing curved lines of the motorcycle.

15. The apparatus of claim 13 wherein said pair of posts are a pair of cylinders and said arches are each generally semi-circular.

16. The apparatus of claim 14 wherein said pair of posts are a pair of cylinders and said arches are each generally semi-circular.

17. The apparatus of claim 14 wherein said shoulders are cupped so that each is shaped in the form of a cup-segment.

18. The apparatus of claim 14 wherein said arches and said shoulders each have an upper surface which is rounded from said front face to said rear face symmetrically about said plane, wherein said plane bisects said pair of posts so that longitudinal axes of symmetry of said each post lie in said plane.

19. The apparatus of claim 13 wherein said lower arch has, at oppositely disposed ends thereof, curved end surfaces shaped for snug conformal mounting onto opposed facing external mating surfaces of said pair of posts.

20. The apparatus of claim 19 wherein said oppositely disposed ends have bores therein extending from apertures in said curved end surfaces, for bolting of said lower arch to said pair of posts by bolts extending through said bores and said apertures.

21. The apparatus of claim 20 wherein said each post in said pair of posts has an aperture in each said mating surface in alignment with said apertures in said curved end surfaces when said lower arch is mounted on said pair of posts, and wherein a collar is mounted co-axially within each said post and adapted for threadably engaging said bolts so as to rigidly sandwich said mating surfaces of said pair of posts between said curved ends of said lower arch and said collars mounted co-axially within each said post.

22. The apparatus of claim 21 further comprising alignment pins mating between said curved ends and mating surfaces so as to align said pair of posts relative to said lower arch.

23. The apparatus of claim 22 wherein said pins are mounted rigidly to, so as to extend from, maid mating surfaces so as to snugly mate into corresponding holes in said curved ends of said lower arch.

24. The apparatus of claim 21 wherein said collars further compose cammed threaded nuts mounted into correspondingly asymmetric cammed apertures in said collars for threaded engagement of said bolts with said cammed threaded nuts.

* * * * *